US009800551B2

(12) United States Patent
Bhattacharjee et al.

(10) Patent No.: US 9,800,551 B2
(45) Date of Patent: Oct. 24, 2017

(54) AVC BI-DIRECTIONAL CORRELATION USING AN OVERLAY FABRIC HEADER

(71) Applicant: Cisco Technology, Inc., San Jose, CA (US)

(72) Inventors: Ripon Bhattacharjee, Fremont, CA (US); Sanjay Kumar Hooda, Cupertino, CA (US); Nalinaksh M. Pai, San Ramon, CA (US); Saravanan Radhakrishnan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 14/831,557

(22) Filed: Aug. 20, 2015

(65) Prior Publication Data
US 2017/0054688 A1    Feb. 23, 2017

(51) Int. Cl.
*H04L 29/06* (2006.01)
*H04L 12/24* (2006.01)
*H04L 12/725* (2013.01)
*H04L 12/721* (2013.01)

(52) U.S. Cl.
CPC ...... *H04L 63/0281* (2013.01); *H04L 41/5003* (2013.01); *H04L 45/306* (2013.01); *H04L 45/38* (2013.01); *H04L 45/72* (2013.01); *H04L 63/0254* (2013.01); *H04L 63/08* (2013.01); *H04L 69/22* (2013.01)

(58) Field of Classification Search
CPC ... H04L 63/0281; H04L 45/38; H04L 45/567; H04L 45/74
See application file for complete search history.

(56) References Cited

U.S. PATENT DOCUMENTS

| 2009/0328186 | A1* | 12/2009 | Pollutro | G06F 21/31 726/13 |
| 2012/0087305 | A1* | 4/2012 | Yamagishi | H04L 12/4633 370/328 |
| 2016/0330111 | A1* | 11/2016 | Manghirmalani | H04L 43/08 |
| 2016/0344640 | A1* | 11/2016 | Soderlund | H04L 47/2483 |
| 2016/0352629 | A1* | 12/2016 | Wang | H04L 41/50 |

* cited by examiner

*Primary Examiner* — Hadi Armouche
*Assistant Examiner* — Hee Song
(74) *Attorney, Agent, or Firm* — Patterson + Sheridan, LLP (57) ABSTRACT

Techniques for tagging packets within a network fabric. An authentication device for a network fabric receives a first packet originating from a source device, in transit to a destination device, corresponding to a first network flow. User identification information corresponding to an authenticated user of the source device is inserted into a Network Services Header of the first packet. Embodiments receive a second packet that corresponds to the first network flow at the authentication device, the second packet including service identification information within a Network Services Header of the second packet that identifies a service type of the network flow. Upon receiving a third packet for the first network flow, the authentication device inserts the user identification and the service identification information into a Network Services Header of the third packet.

18 Claims, 7 Drawing Sheets

AVC BI-DIRECTIONAL CORRELATION USING AN OVERLAY FABRIC HEADER

TECHNICAL FIELD

Embodiments presented in this disclosure generally relate to computer networks, and more specifically, to processing packets within a network fabric based on metadata within overlay fabric headers of the packets.

BACKGROUND

A computer network, in general, allows two or more devices interconnected by communication links and subnetworks to exchange information and/or share resources. The devices may serve as endpoint devices where data is typically originated or terminated in the computer network, or serve as intermediate devices where data is typically routed to other devices (e.g., other intermediate devices, endpoint devices, etc.) and/or subnetworks in the computer network. Examples of intermediate devices include routers, bridges and switches that interconnect communication links and subnetworks, whereas an endpoint device may be a computer located on one of the subnetworks.

Devices in the computer network (e.g., end station, intermediate stations, etc.), in general, communicate by exchanging discrete packets or frames of data according to predefined protocols. In this context, a protocol represents a set of rules defining how the stations interact with each other to transfer data. The traffic flowing into a network device— e.g., a router, switch, bridge, server, and the like—is generally made up of multiple abstraction layers (e.g., the Open Systems Interconnection (OSI) model). Each of these logical layers generally relates to communications functions of a similar nature. Generally, each layer is responsible for providing some service to the layer above it, and similarly each layer may use services of the layer below it. The International Standards Organization (ISO) defined seven layers as a standard for computer networks in creating the OSI model. The layers are defined as follows: (1) the physical layer, (2) the data link layer, (3) the network layer, (4) the transport layer, (5) the session layer, (6) the presentation layer, and (7) the application layer. Generally, the physical layer is responsible for transmitting unstructured bits of information across a link. The data link layer generally provides error-free transfer of data frames over the physical layer, allowing layers above it to assume virtually error-free transmission over the link. The network layer is responsible for ensuring that any pair of systems in the network can communicate with each other, while the transport layer establishes a reliable communications stream between a pair of systems. The session layer generally facilitates the establishment of sessions between processes running on different sessions, by providing functionality for session establishment, maintenance and termination, as well as session support functionality such as security, name recognition services, and so on. Additionally, the presentation layer is responsible for the delivery and formatting of application layer information, while the application layer is responsible with the transfer and manipulating application data (e.g., transferring files, mail services, and so on).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method that includes receiving, at an authentication device for a network fabric, a first packet originating from a source device and in transit to a destination device. The first packet corresponds to a first network flow. The method also includes inserting, at the authentication device, user identification information corresponding to an authenticated user of the source device into a Network Services Header of the first packet. Additionally, the method includes receiving a second packet that corresponds to the first network flow at the authentication device. The second packet includes service identification information within a Network Services Header of the second packet, and the service identification information identifies a service type of the network flow. The method further includes, upon receiving a third packet for the first network flow at the authentication device, inserting the user identification and the service identification information into a Network Services Header of the third packet.

Another embodiment presented in this disclosure provides a network device that includes a plurality of ports and logic that, when executed, performs an operation. The operation includes receiving, on one of the plurality of ports, a first packet originating from a source device and in transit to a destination device, wherein the first packet belongs to a first network flow. The first packet includes a Network Services Header that specifies (i) user identification information corresponding to an authenticated user associated with the first packet and (ii) service identification information that identifies a service type of the first network flow. In such an embodiment, the Network Services Header was inserted into the first packet by one of (i) an authentication device of the enterprise network and (ii) a data center edge device of the enterprise network. The operation also includes processing the first packet at the network device, based on the Network Services Header within the first packet.

Yet another embodiment presented in this disclosure provides a network device that includes a plurality of ports and logic that, when executed, performs an operation. The operation includes receiving a first packet originating from a source device and in transit to a destination device. The first packet corresponds to a first network flow with a network fabric. The operation also includes inserting user identification information corresponding to an authenticated user of the source device into a Network Services Header of the first packet. Additionally, the operation includes receiving a second packet that corresponds to the first network flow. The second packet includes service identification information within a Network Services Header of the second packet, and the service identification information identifies a service type of the network flow. The operation further includes, upon receiving a third packet for the first network flow at the authentication device, inserting the user identification and the service identification information into a Network Services Header of the third packet.

Example Embodiments

Traditionally, configuring network services and security policies for an application network is a time-consuming and complicated task. In many instances, such configuration is the most challenging part of deploying a new application within an application network. However, in many modern networks, it is important to be able to deploy a new application in a relatively short period of time. This is particularly the case in cloud provider and data center networks, where it is desirable for application deployments to take only minutes to complete, if not faster.

Several techniques have been developed in order to reduce deployment time by rapidly configuring network services and network security policies. For example, Cisco® vPath enables network switches to redirect virtual application service traffic before the switch sends the packets to the packets' destination (e.g., a virtual machine within the network). Such functionality is advantageous, as ensuring traffic reaches the proper service node in the proper order and according to the proper service policy is a constant challenge, due in large part to the mobility of virtual machines and virtual services (e.g., between machines or even between data centers).

Additionally, Network Service Headers provide a service chaining protocol that extends to both physical and virtual devices and networks. Generally, Network Services Header describes a "chain" of services (e.g., a sequence of service nodes) that a packet is routed to, prior to reaching the packet's destination. The Network Services Header consists of metadata inserted into the packet header and is transport protocol agnostic. That is, Network Services Header operates independently of any underlying transport protocol and can be transmitted by many commonly used transport protocols. In practice, a network implementing Network Services Header includes control plane logic that exchanges information (e.g., service paths and service chain information) between service nodes within the network. Doing so decouples the network service topology from the physical network topology, thereby simplifying the data plane of the network and its associated configuration.

Figure 1:
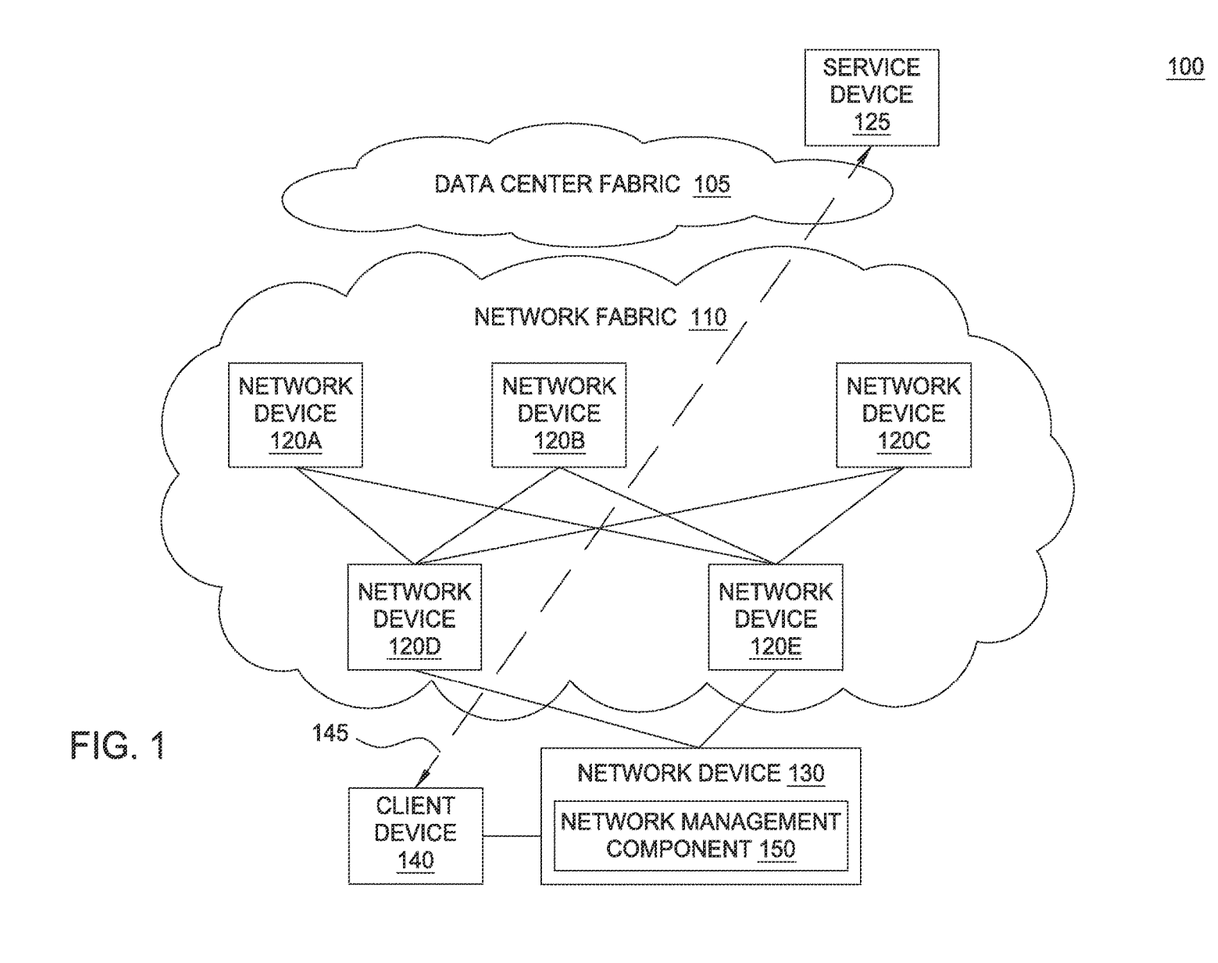
FIG. 1 is a diagram illustrating an enterprise network that includes endpoint devices connected via network fabrics, according to one embodiment described herein.

FIG. 1 is a diagram illustrating an enterprise network that includes endpoint devices connected via network fabrics, according to one embodiment described herein. As shown, the enterprise network 100 includes a service device 125 and a client device 140, interconnected via a data center fabric 105, a network fabric 110 and a network device 130. Additionally, while the network fabric 110 includes network devices 120A-E in the depicted embodiment, one of ordinary skill in the art will understand that any number of network devices 120 can be included in the network fabric 110.

The network device 130 is representative of an authentication device for the network fabric 110 and is configured with a network management component 150. The network management component 150 on the network device 130 may require a user at the client device 140 to successfully authenticate himself, before the network device 130 will send traffic from the client device 140 is sent through the network fabric 110. For example, the user of the client device 140 may authenticate himself by submitting predefined credentials (e.g., a username and password) associated with a user profile. More generally, any authentication technique can be used to authenticate the user, consistent with the functionality described herein.

The service device 125 represents any computing device that hosts a service for the enterprise network. Examples of such services include, without limitation, email services, web services, web application services, streaming services (e.g., audio, video, etc.), database services, and so on. More generally, any network service that provides an application program interface (API) that is accessible using a network can be used, consistent with the functionality described herein.

Generally, the network management component 150 can receive a packet belonging to a particular network flow and originating from the client device 140 and in transit to the service device 125. For example, where the service device 125 represents an email server, the client device 140 could submit a request to retrieve email messages corresponding to the authenticated user. Upon receiving the packet, the network management component 150 can insert user identification information corresponding to the authenticated user of the client device 140 into a Network Services Header of the packet. Generally, the network devices along the path between the client device 140 and the service device 125 (e.g., network devices 120A-E, as well as devices within the data center fabric 105) can use the inserted user identification information in processing the data packet and other data packets in the flow (e.g., providing quality of service (QoS) services for the network flow).

In response to receiving the request for the authenticated user's email messages, the service device 125 could generate another data packet (e.g., a response packet) containing data relating to the email messages and could transmit the other data packet to the client device 140. An authentication device (not shown) for the service device 125 could receive the data packet and could insert service identification information into the Network Services Header of the packet. Generally, the service identification information identifies a service type of the service provided by the service device 125. For example, in an embodiment where the service device 125 hosts an email server application, service identification information identifying an email service type could be inserted into the Network Services Header of the packet.

The response packet could then be transmitted through the data center fabric and the network fabric (e.g., via network devices 120A-E) until the response packet is received by the network device 130. Upon receiving the response packet, the network management component 150 can store the network service information within the Network Services Header of the packet in association with the network flow to which the packet belongs. The network management component 150 can then insert the network service information in addition to the user identification information corresponding to the authenticated user of the client device 140, into the Network Services Headers of subsequent packets received, from the client device 140 and in transit to the service device 125. Doing so ensures that the Network Services Header is populated by trusted sources (e.g., network device 130, using information obtained from the packet created by the authentication device for service device 125) within the enterprise network 100.

Additionally, the network management component 150 (e.g., deployed on intermediary network devices within the enterprise network) can process subsequently received packets from the client device 140 in transit to the service device 125 based on the network service information and the user identification information for the packets. For example, the network management component 150 could determine a Quality of Service (QoS) policy to apply to the subsequently received packets, based on the network service information and the user identification information. As another example, the network management component 150 could perform data collection and logging services, based on the network service information and the user identification information. Doing so enables the network devices within the enterprise network to apply policies to the data packets using the information within the respective Network Services Header within the packets, rather than performing computationally expensive deep packet inspection analysis to determine the type of network service the packets relate to.

For instance, the network management component 150 could determine whether to log information for the data packet, what information to log, and so on for the data packets. Likewise, a respective network management component 150 on each of the network devices 120A-E in the network fabric 110 and the network devices (not shown) within the data center fabric 105 could use the user identification information and network service information within the Network Services Header of the packet in processing the packet (e.g., to determine a forwarding policy for the packet, to determine a data collection for the packet, to determine a logging policy for the packet, etc.). Doing so enables the network devices within the data center fabric 105 and network fabric 110 to quickly determine policy information to apply to the packet based on the information within the Network Services Header of the packet and ensures that the Network Services Header is populated by trusted sources (e.g., network device 130, using information obtained from the packet created by the authentication device for service device 125) within the enterprise network 100.

Figure 2:
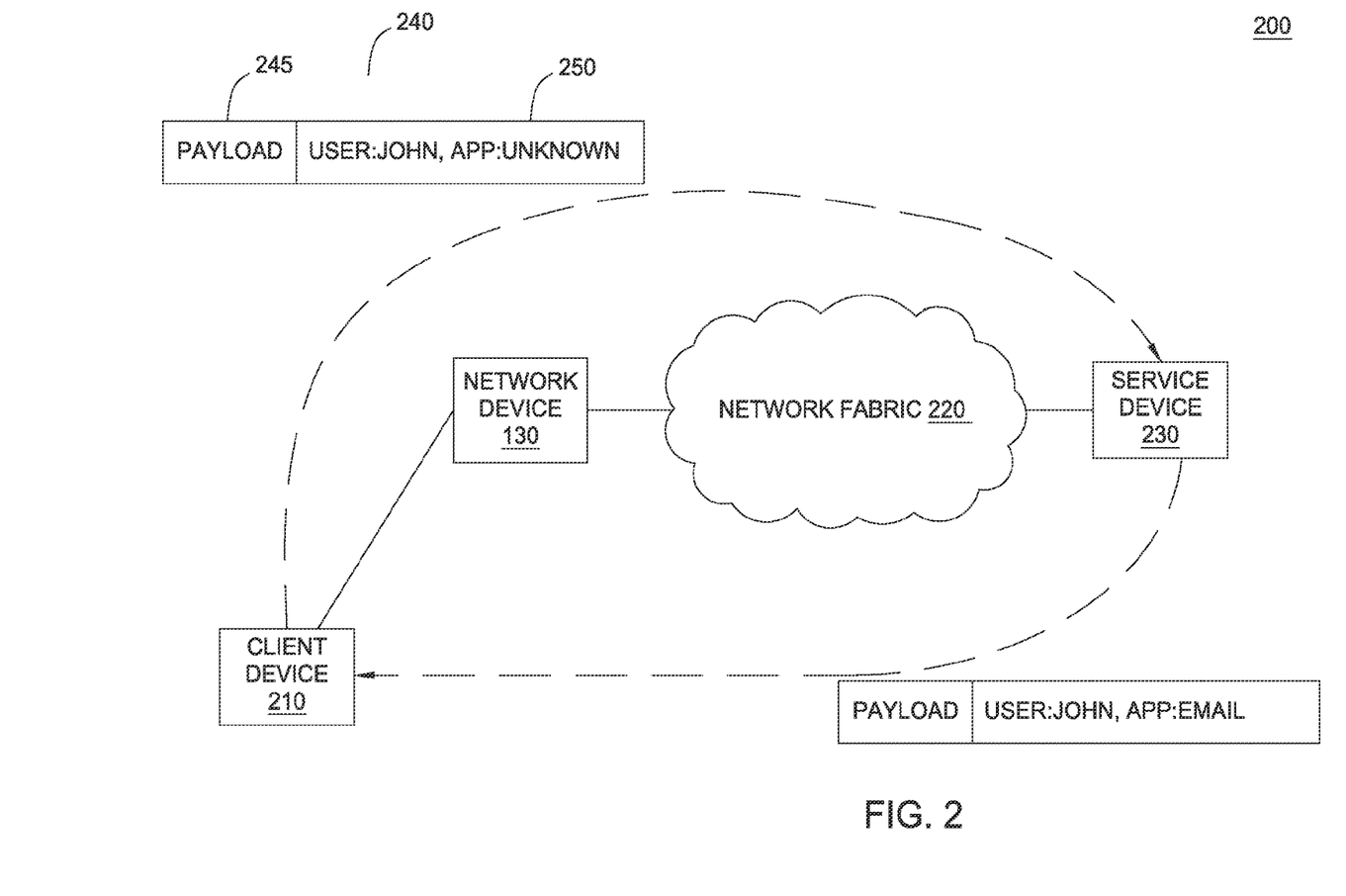
FIG. 2 illustrates a roundtrip workflow of data packets between a client device and a service device through a network fabric, according to one embodiment described herein.

FIG. 2 illustrates a roundtrip workflow of data packets between a client device and a service device through a network fabric, according to one embodiment described herein. As shown, the enterprise network 200 includes a client device and a service device 230, interconnected via the network device 130 and network fabric 220. For purposes of this example, assume that the network device 130 represents an authentication device for the enterprise network 200 and that a user of the client device 210 has successfully authenticated with the network management component 150 on the network device 130.

In the depicted embodiment, the client device 210 has transmitted a data packet to the network device 130, specifying the service device 230 as a destination. Upon receiving the data packet, the network management component 150 on the network device 130 inserts user identification information into the Network Services Header of the data packet, corresponding to a currently authenticated user associated with the client device 210. As shown, the modified data packet 240 includes the payload data 245 of the original data packet received from the client device 210 and further includes Network Services Header 250, specifying the user identification information of "John" and specifying that the network service information is "Unknown." The network management component 150 then forwards the modified data packet 240 on towards the service device 230 through the network fabric 220. An authentication device (not shown) for the service device 230, upon receiving the data packet 240, could save an association between the data flow the packet belongs to and the user identification information (i.e., "John" in this example) within the Network Services Header 250, for use in tagging subsequent packets belonging to the data flow.

Upon receiving the modified data packet, the service device 230 (or an application(s) executing on the service device 230) can generate a response packet to the client device 210. Upon receiving the response packet from the service device 230, the authentication device (not shown) for the service device 230 inserts network service information into the response packet. In the depicted embodiment, the modified response packet 260 includes the payload data of the response packet 265 as well as a Network Services Header 270, specifying the user associated with the data flow is "John" and the network service information specifying that the packet belongs to a data flow of the "Email" application type.

The network device 130 and the network devices within the network fabric 220 can use the information within the Network Services Header 270 of the response packet 260 to apply a routing policy to the response packet 260. For example, the network device 130 could apply a QoS policy to the response packet 260, based on the user identification information of "John" and the network service information of "Email" within the Network Services Header 270 of the response packet 260. Doing so provides an efficient way of determining a routing policy to apply to the response packet 260 (and subsequent packets within the data flow transmitted between the client device 210 and service device 230).

Figure 3:
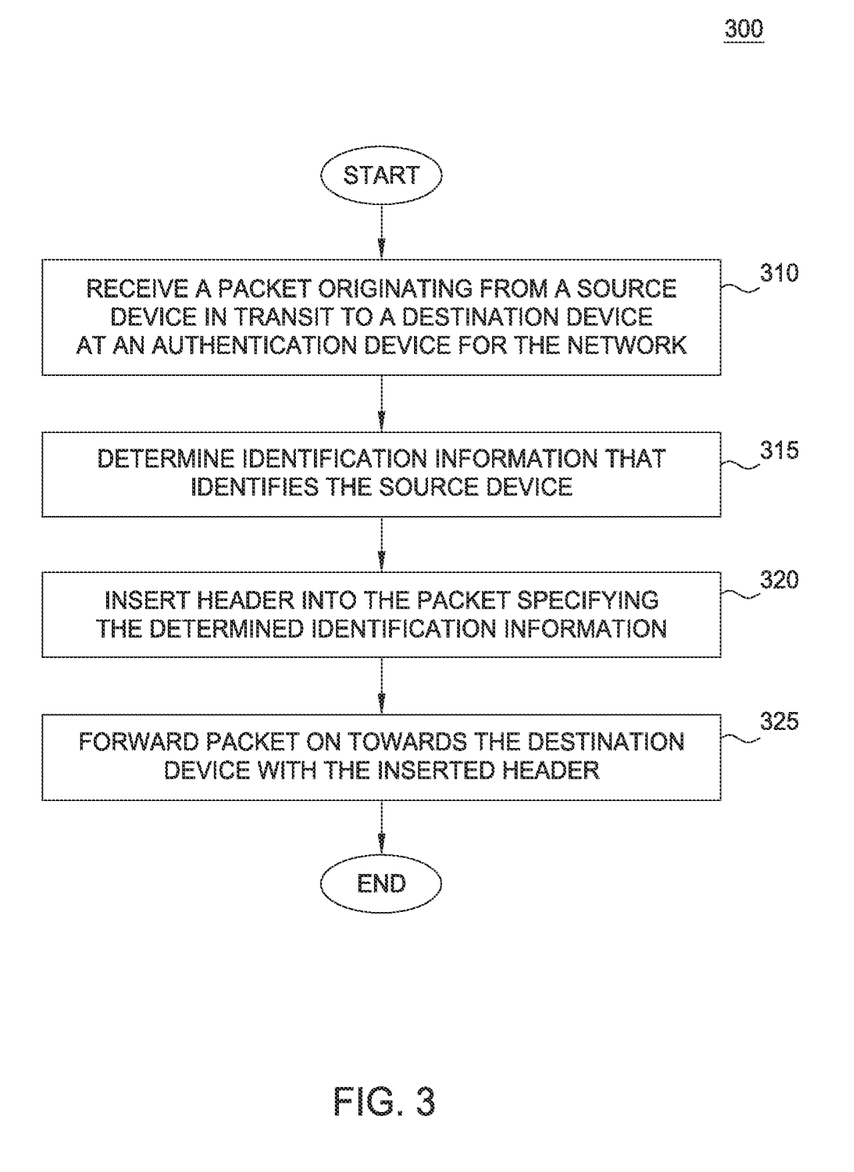
FIG. 3 is a flow diagram illustrating a method of inserting source identification information into a packet header at an authentication device, according to one embodiment described herein.

FIG. 3 is a flow diagram illustrating a method of inserting source identification information into a packet header at an authentication device, according to one embodiment described herein. As shown, the method 300 begins at block 310, where a network management component 150 on an authentication device for an enterprise network receives a packet originating from a source device and in transit to a destination device. For example, the network management component 150 could be executing on the network device 130 in the enterprise network 100.

The network management component 150 determines user identification information corresponding to the source device from which the packet originated (block 315). For instance, the network management component 150 could determine the currently active authenticated user for the source device. As discussed above, users can authenticate themselves using any number of suitable techniques and types of credentials (e.g., login/password, token-based authentication, etc.).

In particular embodiments, source identifiers other than user identification information can be used. For instance, the network management component 150 may not have user identification information that uniquely identifies a user connected to a guest portal of the enterprise network. In such an example, the network management component 150 could use the user's class (e.g., guest) as the user identification information. More generally, any type of user identification information that describes a user of the enterprise network can be used, consistent with the functionality described herein.

The network management component 150 then inserts the determined user identification information into a Network Services Header of the received data packet (block 320). In other words, the user identification information is specified within the data packet by a trusted source (i.e., an authentication device for the enterprise network), thereby preventing users from falsifying the user identification information (e.g., to gain more favorable routing policies within the enterprise network). The network management component 150 then forwards the modified packet on towards the packet's destination (block 325), and the method 300 ends.

Figure 4:
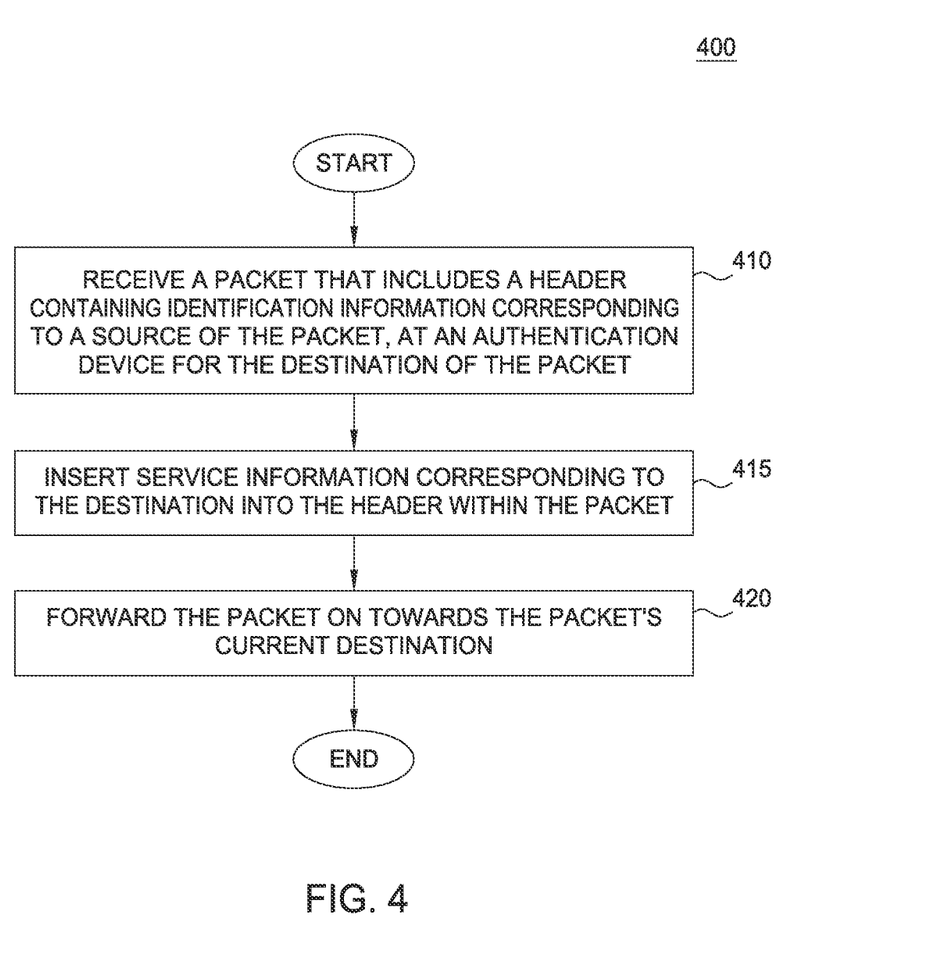
FIG. 4 is a flow diagram illustrating a method of inserting service identification information into a packet header at an authentication device, according to one embodiment described herein.

As discussed above, the network devices within the enterprise network can generally use the user identification information within the Network Services Header of the data packet to determine a policy to apply in processing the packet (e.g., a routing policy for the data packet such as a QoS policy, a logging policy indicating whether and how to collect data relating to the data packet, etc.). Additionally, the Network Services Header can contain service identification information describing a type of service the data packet (and, more generally, all data packets in the data packet's network flow) relates to. An example of this is shown in FIG. 4, which is a flow diagram illustrating a method of inserting service identification information into a packet header at a data center switch connected to a service device, according to one embodiment described herein. As shown, the method 400 begins at block 410, where a network management component 150 at the data center switch connected to the service device receives a data packet that includes a Network Services Header containing user identification information corresponding to a source of the packet. Upon receiving the data packet, the network management component 150 at the data center switch could store the user identification information in association with the network flow to which the data packet belongs, for use in tagging subsequent data packets in the flow.

The network management component 150 then inserts service identification information into the Network Services Header of the data packet, where the service identification information uniquely identifies a type of service provided by the service device (block 415). The network management component 150 then forwards the modified data packet on towards its specified destination (block 420), and the method 400 ends. Moreover, the network management component 150 can tag all subsequent data packets passing through the data center switch and belonging to the network flow by inserting the user identification information and service identification information into the respective Network Services Headers of the data packets. Doing so enables the intermediate network devices processing the data packets to apply policies to the data packets, based on the information within the packets' Network Services Headers.

Figure 5:
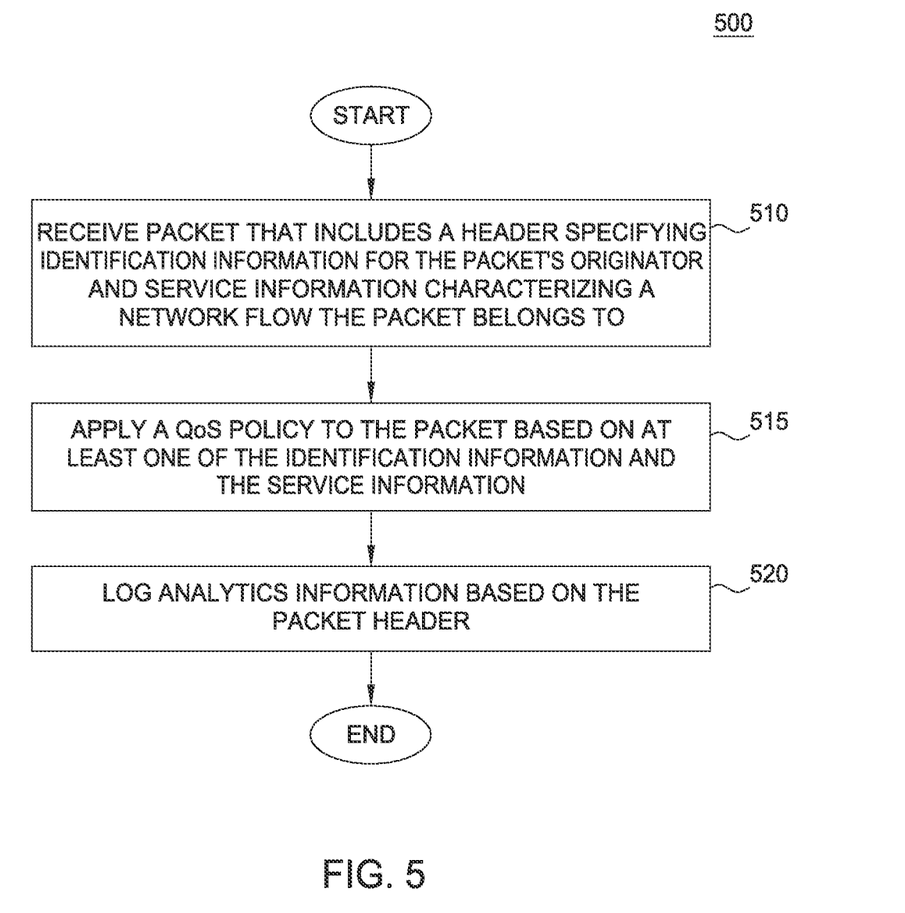
FIG. 5 is a flow diagram illustrating a method of processing a packet based on a packet header specifying source identification information and service identification information for a network flow, according to one embodiment described herein.

An example of such processing by an intermediary node is shown in FIG. 5, which is a flow diagram illustrating a method of processing a packet based on a packet header specifying source identification information and service identification information for a network flow, according to one embodiment described herein. As shown, the method 500 begins at block 510, where the network management component 150 on an intermediate network device receives a packet having a Network Services Header that specifies user identification information and service identification information. For example, the user identification information and service identification information could have been inserted into the data packet using the methods 300 and 400 discussed above.

The network management component 150 applies a QoS policy to the data packet, based on at least one of the user identification and service identification information within the Network Services Header of the data packet (block 515). For instance, a particular type of network service (e.g., streaming video) could be designated as a lower priority service within the enterprise network and a corresponding QoS policy could be assigned to network traffic associated with the network service. Upon determining that the service identification information for the data packet identifies the data packet as belonging to a lower priority service, the network management component 150 could apply the corresponding QoS policy to the forwarding of the data packet. As another example, the network management component 150 could be configured to apply different QoS policies to network traffic belonging to "guest" users relative to registered users of the enterprise network, and thus the network management component 150 could determine a QoS policy to apply to the data packet based on the user identification information within the packet's Network Services Header. While the aforementioned examples are provided for illustrative purposes, one of ordinary skill in the art will recognize that any sort of QoS policy or, more generally, any sort of packet processing and/or forwarding policy can be applied to the data packet based on the information within the Network Services Header of the data packet, consistent with the functionality described herein. For example, the network management component 150 could apply a routing policy based on the user identification and service identification information with the Network Services Header, e.g., routing the data packets through a particular service device. Doing so enables intermediary network devices to apply an appropriate networking policy to the data packet using the information within the Network Services Header of the data packet and without having to perform computationally expensive packet inspection operations to determine the service type the data packet relates to.

Additionally, in the depicted example, the network management component 150 logs analytics information based on the information with the Network Services Header of the data packet (block 520), and the method 500 ends. For example, the network management component 150 could be configured to generate a log describing accesses to a particular type of network service, and the network management component 150 could generate such a log entry upon determining that a data packet's Network Services Header contains service identification information indicating that the data packet relates to the particular type of network service. As another example, the network management component 150 could be configured to generate log entries describing network services that a particular user is accessing within the enterprise network, and could do so using the information with the Network Services Header of the data packet. Doing so enables the network devices to efficiently generate log entries relating to the data packet using the information with the data packet's Network Services Header and without having to perform deep packet inspection operations to classify the type of service the data packet belongs to.

Figure 6:
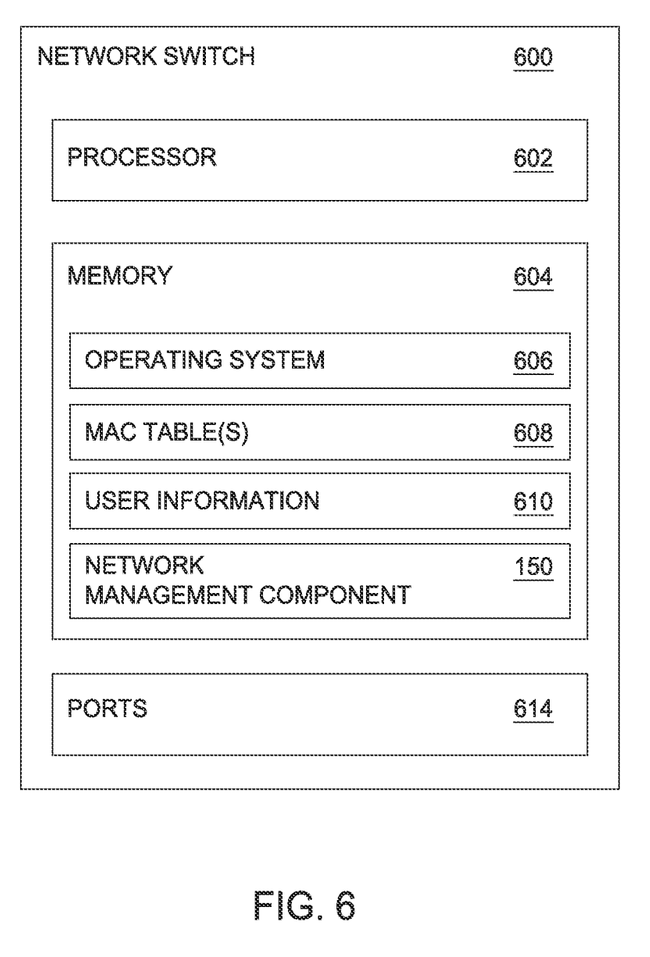
FIG. 6 is a block diagram illustrating a network switch configured with a network management component 150, according to one embodiment described herein.

FIG. 6 is a block diagram illustrating a network switch configured with a network management component, according to one embodiment described herein. The network switch 600 includes a processor 602, a memory 604, and a plurality of ports 614. The processor 602 may be any processing element capable of performing the functions described herein, and such a processor can represent a single processor, multiple processors, a processor with multiple cores, and combinations thereof. Of course, the depicted example is for illustrative purposes only, and it is contemplated that certain embodiments may be implemented without such processors.

The memory 604 may be either volatile or non-volatile memory and include, RAM, flash, cache, disk drives and the like. Although shown as a single entity, the memory 604 may be divided into different memory storage elements such as RAM and one or more hard disk drives. In one embodiment, the memory 604 comprises one or more static random access memory (SRAM) modules. As shown, the memory 604 includes an operating system 606, MAC table(s) 608, user information 610 and network management component 150. The operating system 606 generally controls the execution of application programs on the network switch 600. Examples of operating system 606 include, without limitation, versions of Cisco® IOS®, Cisco® Catalyst OS, UNIX and distributions of the Linux® operating system.

Generally, the MAC table(s) 608 represents a data structure that maps MAC addresses to ports in the plurality of ports 614. In one embodiment, the MAC table(s) 608 is stored in a ternary content addressable memory (TCAM). Additionally, memory 604 may include one or more buffers (not shown). Such buffers generally represent temporary storage entities that may be used in conjunction with storing one or more bits of data that are transmitted (e.g., in the case re-transmit is enabled) and/or received for processing by a metaframe decoder, FEC decoder, etc. (e.g., for processing of received data).

Figure 7:
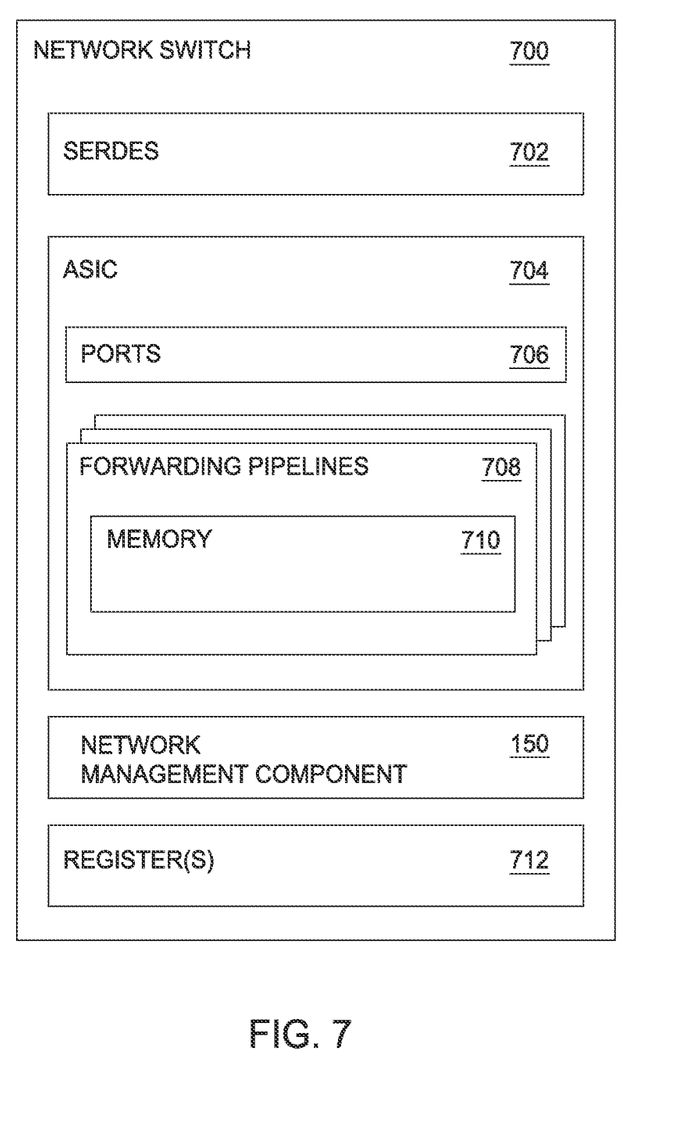
FIG. 7 is a block diagram illustrating another network switch configured with a network management component 150, according to one embodiment described herein.

FIG. 7 is a block diagram illustrating another network switch configured with a network management component, according to one embodiment described herein. The network switch 700 includes a SerDes 702, an ASIC 704, network management component 150 and register(s) 712. As shown, the ASIC 704 includes a plurality of ports 706 and a plurality of forwarding pipelines 708. In one embodiment, the network switch 700 further contains one or more processors (not shown). The processor(s) may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

Each of the forwarding pipelines 708 includes a memory 710. The memory 710 may be either volatile or non-volatile memory and include, RAM, flash, cache, disk drives and the like. Although shown as a single entity, the memory 710 may be divided into different memory storage elements such as RAM and one or more hard disk drives. In one embodiment, the memory 710 comprises one or more static random access memory (SRAM) modules. The memory 710 can include user information (not shown) that generally stores identification information for authenticated users of the network fabric.

In one embodiment (e.g., where the network management component 150 is deployed on an authentication device for an enterprise network), the network management component 150 on the network switches 600 and 700 is configured to tag packets flowing through a network fabric. For example, the network management component 150 could receive a first packet originating from a source device, in transit to a destination device, corresponding to a first network flow. The network management component 150 could determine user identification information (e.g., within the user information 610) corresponding to an authenticated user of the source device. The network management component 150 could then insert the user identification information into a Network Services Header of the first packet. Subsequently, the network management component 150 could receive a second packet that corresponds to the first network flow, the second packet including a Network Services Header that specifies the user identification information as well as service identification information that identifies a service type of the network flow. The network management component 150 could then store the user identification information and service identification information, as well as an association between the user and service identification information and the first network flow. And upon receiving a subsequent packet belonging to the first network flow, the network management component 150 could insert the user identification and the service identification information into the Network Services Header of the packet, prior to forwarding the packet on towards its destination. Such information can then be used by intermediary network devices along the packet's route towards its destination to apply routing policies to the data packet, without having to perform computationally expensive deep packet inspection operations to classify the data packet.

In another embodiment (e.g., where the network management component 150 is deployed on an intermediary network device within the enterprise network), the network management component 150 is configured to receive a data packet on one of the plurality of ports 614 or 706, where the data packet belongs to a first network flow and includes a Network Services Header that specifies (i) user identification information corresponding to an authenticated user associated with the data packet and (ii) service identification information that identifies a service type of the first network flow. Generally, the Network Services Header was inserted into the first packet by one of an authentication device and a data center edge device of the enterprise network. The network management component 150 could then process the data packet based on the Network Services Header within the first packet (e.g., by applying one or more forwarding and/or logging policies to the data packet).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, a portion of the resources may include intermediate devices, such as routers, switches, etc., that are located in the cloud and these intermediate devices may communicate utilizing any of the techniques presented herein. For example, a number of the switches could perform data-cut through based on checkpoints inserted into one or more metaframes and/or on-demand FEC for any of the communications passing through the cloud. Doing so may reduce the latency and/or power consumed by the resources in the cloud.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, at a first authentication device for a network fabric, a first packet originating from a source device and in transit to a destination device, wherein the first packet corresponds to a first network flow;
inserting, at the first authentication device, user identification information corresponding to an authenticated user of the source device into a Network Services Header of the first packet;
receiving a second packet, originating at the destination device and in transit to the source device, that corresponds to the first network flow at the first authentication device, wherein the second packet includes service identification information within a Network Services Header of the second packet, wherein the service identification information identifies a service type of the network flow, and wherein the service identification information was inserted into the Network Services Header of the second packet by a second authentication device for the destination device;
upon receiving a third packet for the first network flow at the authentication device, inserting the user identification and the service identification information into a Network Services Header of the third packet, the third packet being classified without performing a deep packet inspection analysis; and
forwarding the packet according to a Quality of Service (QoS) policy, determined based on the user identification information and the service identification information within the Network Services Header of the third packet.

2. The method of claim 1, wherein a second authentication device for the network fabric is configured to insert the service identification information into the Network Services Header of the packet, based on a service provided by the destination device.

3. The method of claim 1, wherein network devices within the network fabric are configured to provide QoS services for a plurality of packets of the first network flow, based on the user identification information and service identification information within Network Services Header of the plurality of packets.

4. The method of claim 1, wherein network devices within the network fabric are configured to generate network analytics for a plurality of packets of the first network flow, based on the user identification information and service identification information within Network Services Header of the plurality of packets.

5. The method of claim 1, wherein the user identification information is determined based on a currently active user for the source device that was successfully authenticated by the authentication device.

6. The method of claim 1, further comprising:
upon receiving the second packet corresponding to the first network flow at the authentication device, storing the service identification information within the Network Services Header of the second packet in storage of the authentication device, for inserting into Network Services Header of packets subsequently received at the authentication device and corresponding to the first network flow.

7. A network device, comprising:
a plurality of ports; and
logic that, when executed, performs an operation comprising:
receiving a first packet originating from a source device and in transit to a destination device, wherein the first packet corresponds to a first network flow with a network fabric;
inserting user identification information corresponding to an authenticated user of the source device into a Network Services Header of the first packet;
receiving a second packet, originating at the destination device and in transit to the source device, that corresponds to the first network flow, wherein the second packet includes service identification information within a Network Services Header of the second packet, wherein the service identification information identifies a service type of the network flow, and wherein the service identification information was inserted into the Network Services Header of the second packet by an authentication device for the destination device;
upon receiving a third packet for the first network flow, inserting the user identification and the service identification information into a Network Services Header of the third packet, the third packet being classified without performing a deep packet inspection analysis; and
forwarding the packet according to a Quality of Service (QoS) policy, determined based on the user identification information and the service identification information within the Network Services Header of the third packet.

8. The network device of claim 7, wherein a second authentication device for the network fabric is configured to insert the service identification information into the Network Services Header of the packet, based on a service provided by the destination device.

9. The network device of claim 7, wherein a second network device within the network fabric is configured to provide QoS services for a plurality of packets of the first network flow, based on the user identification information and service identification information within Network Services Header of the plurality of packets.

10. The network device of claim 7, wherein a second network device within the network fabric is configured to generate network analytics for a plurality of packets of the first network flow, based on the user identification information and service identification information within Network Services Header of the plurality of packets.

11. The network device of claim 7, wherein the user identification information is determined based on a currently active user for the source device that was successfully authenticated by the authentication device.

12. The network device of claim 7, the operation further comprising:
upon receiving the second packet corresponding to the first network flow at the authentication device, storing the service identification information within the Network Services Header of the second packet in storage of the authentication device, for inserting into Network Services Header of packets subsequently received at the authentication device and corresponding to the first network flow.

13. A non-transitory computer-readable medium containing computer program code that, when executed by operation of one or more computer processors, performs an operation, comprising:
receiving, at a first authentication device for a network fabric, a first packet originating from a source device and in transit to a destination device, wherein the first packet corresponds to a first network flow;
inserting, at the first authentication device, user identification information corresponding to an authenticated user of the source device into a Network Services Header of the first packet;
receiving a second packet, originating at the destination device and in transit to the source device, that corresponds to the first network flow at the first authentication device, wherein the second packet includes service identification information within a Network Services Header of the second packet, wherein the service identification information identifies a service type of the network flow, and wherein the service identification information was inserted into the Network Services Header of the second packet by a second authentication device for the destination device;
upon receiving a third packet for the first network flow at the authentication device, inserting the user identification and the service identification information into a Network Services Header of the third packet, the third packet being classified without performing a deep packet inspection analysis; and
forwarding the packet according to a Quality of Service (QoS) policy, determined based on the user identification information and the service identification information within the Network Services Header of the third packet.

14. The non-transitory computer-readable medium of claim 13, wherein a second authentication device for the network fabric is configured to insert the service identification information into the Network Services Header of the packet, based on a service provided by the destination device.

15. The non-transitory computer-readable medium of claim 13, wherein network devices within the network fabric are configured to provide QoS services for a plurality of packets of the first network flow, based on the user identification information and service identification information within Network Services Header of the plurality of packets.

16. The non-transitory computer-readable medium of claim 13, wherein network devices within the network fabric are configured to generate network analytics for a plurality of packets of the first network flow, based on the user identification information and service identification information within Network Services Header of the plurality of packets.

17. The non-transitory computer-readable medium of claim 13, wherein the user identification information is determined based on a currently active user for the source device that was successfully authenticated by the authentication device.

18. The non-transitory computer-readable medium of claim 13, the operation further comprising:
upon receiving the second packet corresponding to the first network flow at the authentication device, storing the service identification information within the Network Services Header of the second packet in storage of the authentication device, for inserting into Network Services Header of packets subsequently received at the authentication device and corresponding to the first network flow.

* * * * *

UNITED STATES PATENT AND TRADEMARK OFFICE
CERTIFICATE OF CORRECTION

PATENT NO. : 9,800,551 B2
APPLICATION NO. : 14/831557
DATED : October 24, 2017
INVENTOR(S) : Ripon Bhattacharjee et al.

It is certified that error appears in the above-identified patent and that said Letters Patent is hereby corrected as shown below:

In the Specification

In Column 11, Line 63, delete "users" and insert -- user's --, therefor.

In Column 11, Line 66, delete "users" and insert -- user's --, therefor.

Signed and Sealed this
Twenty-fourth Day of April, 2018

Andrei Iancu
*Director of the United States Patent and Trademark Office*